> United States Patent Office
2,819,974
Patented Jan. 14, 1958

2,819,974
4,4'-ALKYLIDENEBIS(5-ACENAPHTHENOLS)

Alan Bell and Wayne V. McConnell, Kingstport, Tenn., assignors to Eastman Kodak Company, Rochester, N. Y., a corporation of New Jersey No Drawing. Application October 24, 1956
Serial No. 617,939

14 Claims. (Cl. 99—163)

This invention relates to compositions of matter comprising normally oxidizable organic material stabilized against the deleterious effects of oxidation with new and improved antioxidants. The invention is particularly concerned with the stabilization of such materials as fats, fatty oils, hydrocarbons, petroleum derivatives, polymeric materials, vitamins, essential oils, grease, citrus oils, and similar oxidizable organic compositions employing 4,4'-alkylidenebis (5-acenaphthenols) as antioxidants. This invention also relates to these compounds as new compositions of matter and to means for their preparation.

For many years, attempts have been made to overcome the deleterious effects of oxidation on organic materials which normally possess relatively low resistance to oxidation. A large number of antioxidants have been proposed and are widely used in stabilizing the various oxidizable materials. Because of the widespread use of compositions which need to be stabilized, the search for even more potent and generally advantageous antioxidants is continuing.

It is accordingly an object of this invention to provide compositions comprised predominantly of normally oxidizable organic materials stabilized with an improved antioxidant effective to prevent the deleterious effects of oxidation for much longer periods of time and in a generally more advantageous manner than was possible with the antioxidants known heretofore and which can be used in much smaller amounts than has been possible with conventional antioxidants.

Another object of the invention is to stabilize such normally oxidizable organic materials as the fatty materials, including both solid fats and fatty oils, oxidizable hydrocarbons, including the polymeric hydrocarbons, terpenes, etc., petroleum derivatives such as waxes, mineral oils, gasoline, impregnating oils, fuel oils, and the like, vitamins, essential oils such as citrus oils and the like, and similar well known materials normally subject to oxidation.

A still further object of the invention is to stabilize normally oxidizable organic materials by means of 4,4'-alkylidenebis (5-acenaphthenols) whereby improved stability is obtained over the stability resulting from the use of the conventional antioxidants known heretofore.

A further object of this invention is to provide 4,4'-alkylidene(5-acenaphthenols) as new compositions of matter and means for their preparation.

Other objects will be apparent from the description and claims which follow.

In accordance with a principal embodiment of this invention there is provided a new class of chemical compounds having the following formula:

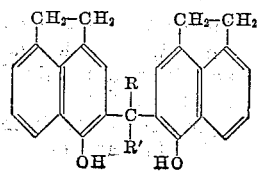

wherein R and R' each represents a member selected from the group consisting of a hydrogen atom and an alkyl radical containing from 1 to 8 carbon atoms. Thus, R and R' can represent, for example, a hydrogen atom, an ethyl radical, an isopropyl radical, a cycloalkyl radical such as a cyclohexyl radical, a tertiary butyl radical, a 2-ethylhexyl radical, etc.

Examples of compounds which come within the scope of the above general formula include 4,4'-methylene bis(5-acenaphthenol), 4,4' - ethylidenebis(5 - acenaphthenol), 4,4'-isobutylidenebis(5-acenaphthenol), 4,4' - butylidenebis(5 - acenaphthenol), 4,4' - (2-ethylbutylidene)bis(5-acenaphthenol), 4,4'-(2-ethylhexylidene)bis(5 - acenaphthenol), etc.

In accordance with another embodiment of this invention there is provided a process for preparing these compounds as in the above general formula which comprises condensing in the presence of an acidic condensing agent 5-acenaphthenol with a carbonyl compound having the following general formula: RR'C=O wherein R and R' have been defined hereinabove.

Although the reaction conditions for the employment of an aldehyde of the above formula are fairly mild and take place at temperatures of from about room temperature or less up to 100° C., it is generally advantageous to carry out the reaction at temperatures of about 20–30° C. The reaction conditions for the employment of ketones are much more rigorous and involve the employment of elevated reaction temperatures and the stronger acidic condensing agents.

The general techniques employed for the preparation of the compounds of this invention are based upon those well-known techniques involved in the condensation of phenolic compounds with aldehydes or ketones, using a wide range of conditions, so as to obtain alkylidenebisaryl compounds. Quite a number of patents have been issued covering such reactions, and they are well described in the literature.

The acidic condensing agents which can be employed, as are well known in the art, include calcium chloride, zinc chloride, mineral acids such as sulfuric acid, hydrochloric acid, and can be employed in conjunction with other materials such as thioglycolic acid or employing other known means for enhancing the accomplishment of the general class of reactions of which this is representative.

The reaction can be carried out in various inert media such as ethyl ether, any of the higher boiling dialkyl ethers, aliphatic hydrocarbons, aromatic hydrocarbons, chlorinated aliphatic and aromatic solvents, etc. These media can be selected to suit the conditions of the reactions that are most appropriate. Such media and their use are well known in the art.

The reactions between 5-acenaphthenol and any of the aldehydes of the general formula given above take place readily at 20–30° C. Some of the compounds described herein can be obtained in good yield by carrying out the condensation reaction at from 3 to 4 hours at about 30° C. Reaction temperatures lower than about 20° C. can be employed but generally offer no advantages over the above range. The temperatures of from 30 to 100° C. are permissible but under such conditions the addition of the carbonyl compound must be carefully controlled so as to minimize the production of byproducts.

The 5-acenaphthenol employed as a starting material in the reaction can be prepared according to the method described by H. Rapoport in the Journal of the American Chemical Society 73, 2719, (1951).

This invention can be further illustrated by the following examples of preferred embodiments although it will be understood that these examples are included merely for purposes of illustration and are not intended to limit the scope of the invention unless otherwise specifically indicated.

*Example 1.—Preparation of 4,4'-methylenebis (5-acenaphthenol)*

17 g. (0.1 mole) of 5-acenapthenol, 30 ml. of ethyl ether, 3 g. of calcium chloride, 1 ml. concentrated hydrochloric acid, and 3 drops of thioglycolic acid were mixed in a 250-ml., 3-neck flask. To the stirred mixture, 4 g. (0.05 mole) of 38% aqueous formaldehyde was added dropwise at such a rate to keep the reaction temperature below 30° C. After the aldehyde had been added, the mixture was stirred for 15 hours at room temperature and was then refluxed for 4 hours. The solid was filtered and washed with water until the wash was substantially neutral. The cake on drying weighed 17.5 g. and melted at 215–220° C. This product was very light colored and without further purification was suitable for most purposes for use as a stabilizer. Recrystallization from acetone gave a white solid which melted at 224–226° C.

*Example 2.—Preparation of 4,4'-(2-ethylhexylidene)bis (5-acenaphthenol)*

The reaction conditions disclosed in Example 1 were followed to prepare 4,4'-(2-ethylhexylidene)bis(5-acenaphthenol) from 8.5 g. (0.5 mole) of 5-acenaphthenol and 3,2 g. (0.025 mole) of 2-ethylhexaldehyde. The product was soluble in ether and hence was recovered from the ether filtrate rather than from the cake as in Example 1. On evaporation of the ether, 9 g. of the desired bisacenaphthenol was obtained. Recrystallization from ethanol-water or from 1,2-dichloroethane-hexane mixtures gave a product melting at 202–203° C.

*Example 3.—Preparation of 4,4'-isobutylidenebis (5-acenaphthenol)*

This compound was prepared from 5-acenaphthenol and isobutyraldehyde by a procedure similar to that described in Example 1 except that benzene was added after the ether suspension had been stirred for 15 hours at room temperature. The mixture was then heated and the ether was distilled. After the ether was removed, the mixture was refluxed 2 hours. The product was filtered and washed with water until neutral. 10 g. of light colored solid was obtained from 17 g. (0.1 mole) of 5-acenaphthenol and 3.6 g. (0.05 mole) of isobutyraldehyde. After one recrystallization from acetone, a white solid melting at 246–269° C. was obtained.

By employing the procedure set forth in Example 3, the compounds listed in Examples 4–6 were prepared from two moles of 5-acenaphthenol and one mole of the appropriate carbonyl compound. The crude reaction products represented substantially quantitative yields of the desired 4,4'-alkylidenebis(5-acenaphthenols), and the products obtained directly from the reaction mixture were evaluated as lard antioxidants without further purification. Since the longer alkyl chains attached to the methylene bridge increase the solubility of the bisacenaphthenols in the solvents used in the reaction mixture, it was necessary to isolate the product both from the filter cake and filtrate to obtain optimum yields. The products were buff to light brown in color.

| Example No. | Alkylidenebisacenaphthenol | Carbonyl Compounds Used |
|---|---|---|
| 4 | 4,4'-ethylidenebis(5-acenaphthenol) | acetaldehyde. |
| 5 | 4,4'-propylidenebis(5-acenaphthenol) | propionaldehyde. |
| 6 | 4,4'-butylidenebis(5-acenaphthenol) | n-butyraldehyde. |

*Example 7.—Preparation of 4,4'-sec-butylidenebis (5-acenaphthenol)*

As previously mentioned, ketones require more drastic conditions than aldehydes in order to effect the desired condensation with 5-acenaphthenol. The following exemplifies such a reaction involving ketones:

A mixture of 8.5 g. (0.050 mole) of 5-acenaphthenol, 1.8 g. (0.025 mole) of methyl ethyl ketone, 60 ml. of benzene and 2 g. of pulverized zinc chloride was saturated with anhydrous hydrogen chloride. The mixture was then refluxed for 15 hours and steam bath. After cooling, the solid product was filtered and washed well with water. The product was recrystallized twice from acetone-water mixtures to give 0.8 g. of a white solid melting at 235–240° C.

*Example 8.—Evaluation of 4,4'-alkylidenebis(5-acenaphthenols) as lard antioxidants*

The 4,4'-alkylidenebis(5-acenaphthenols) such as have been described in Examples 1–7 were very effective in stabilizing lard against oxidation deterioration. According to AOM test data, these compounds are superior as lard antioxidants to the commercial oxidants which are commonly used for this purpose. The AOM values found for the alkylidenebis(5-acenaphthenols) are shown in Table I. The corresponding data for some of the commercial antioxidants are included in this table for purposes of comparison. The alkylidenebisacenaphthenols are also effective stabilizers for other edible fats and oils, industrial oils of petroleum and vegetable origin, petroleum products, waxes, grease, plastics, synthetic resin compositions, cellulose esters, polyesters, polyethylene, vinyl chloride, alkyd reins, etc.

TABLE I

| Antioxidant Added (0.02% Concentration) | AOM Values, Hrs. to Reach PV 20 | Antiox. Index |
|---|---|---|
| None (control lard No. L42) | 16 | |
| BHA (2- and 3-isomers of tert. butyl-4-hydroxyanisole) | 41 | 1.0 |
| BHT (3,5-ditert. butyl-4-hydroxytoluene) | 52 | 1.3 |
| Propyl Gallate | 90 | 2.2 |
| NDGA (nordihydroguaiaretic acid) | 100 | 2.4 |
| 2,2-Methylenebis(6-tert-butyl-p-cresol) | 100 | 2.4 |
| 4,4'-Methylenebis(5-acenaphthenol) | 235 | 5.7 |
| 4,4'-Ethylidenebis(5-acenaphthenol) | 210 | 5.1 |
| 4,4'-Propylidenebis(5-acenaphthenol) | 220 | 5.4 |
| 4,4'-Isobutylidenebis(5-acenaphthenol) | 250 | 6.1 |
| 4,4'-Butylidenebis(5-acenaphthenol) | 240 | 5.9 |
| 4,4'-(2-ethylhexylidene)bis(5-acenaphthenol) | 190 | 4.6 |
| 4,4'-sec-Butylidenebis(5-acenaphthenol) | 215 | 5.3 |

In Table I, lard was employed as the substrate being stabilized, and the stability was evaluated by the accelerated Active Oxygen Method (AOM) wherein air is bubbled through the lard containing the antioxidant at a temperature of 98.8° C. and the oxidation is followed by a determination of the milliequivalents of peroxide formed per kilogram of substrate. Ordinarily, a peroxide value (PV) of 20 is the upper limit which can be tolerated in edible fats. Above this value, the fats exhibit an objectionable degree of rancidity. Thus in Table I, the number of hours required to reach a peroxide value of 20 milliequivalents per kilogram are set out. The last column in the table headed antioxidant index shows the comparative activity of the antioxidants based on the activity of butylated hydroxy anisole as 1.

As can be seen from Table I, the particular compounds of this invention as listed are from 4.6 to 6.1 times as effective as BHA. It is apparent that these compounds are from 1.9 to 2.5 times as effective as NDGA. The isobutylidene derivative is the especially preferred antioxidant of this invention.

This application is somewhat related to a copending application filed August 10, 1954, by C. E. Tholstrup et al., Serial No. 449,016, which describes other applications of antioxidants illustrating still further how the present invention can be practiced.

According to a preferred embodiment of this invention, there is provided fats and oils stabilized with at least 0.0001% by weight of a compound having the following formula:

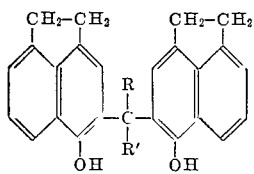

wherein R and R' each represents a member selected from the group consisting of a hydrogen atom and an alkyl radical containing from 1 to 8 carbon atoms.

Generally, from about 0.001% to about 0.1% by weight of at least one of these antioxidants can be advantageously employed. Of course, higher and lower amounts, based on the weight of the substrate, can also be used.

Fats and oils in their broad sense include animal, vegetable, fish and mineral oils, waxes, fuels, lubricants, fats, greases and the like, e. g. lard, lard oil, cottonseed oil, peanut oil, lanolin, mutton tallow and grease, beef tallow, white and yellow greases, linseed oil, cod liver oil, castor oil, olive oil, coconut oil, palm oil, corn oil, paraffin oil, carnauba wax, paraffin wax, beeswax, sperm oil, kerosene, gasoline, transformer oils, essential oils, citrus oils such as lemon oil, mono-, di- and triglycerides of various saturated and unsaturated fatty acids, hydrogenated fats and oils, etc., as well as materials containing a substantial proportion of any of the waxes, fats or oils, e. g. fish meals, certain animal feeds, paint vehicles, furniture polishes, floor waxes, automobile polishes, cottage cheese, milk, milk solids, powdered or whole eggs, egg yolks, mayonnaise, butter, margarine, salad dressing, etc. The term fats and fatty oils in the more limited sense includes those materials containing esters derived from glycerine, i. e., the various glycerides of the so-called fatty acids.

Similarly improved results are obtained by incorporating a 4,4-alkylidenebis(5-acenaphthenol) in any of the other normally oxidizable materials which require an antioxidant during use. Thus, by means of this invention, compositions of greatly improved stability against oxidation are readily obtained. The antioxidant effect of a 4,4'alkylidenebis(5-acenaphthenol) makes the preparation of highly stable compositions possible, and the antioxidant can be used in much lower concentrations than was possible with the antioxidants employed heretofore. As with other antioxidants, the 4,4'alkylidenebis(5-acenaphthenols) can be employed alone as shown in the data set out in the table, or they can be employed in combination with other members of their group or with one or more other stabilizers such as are well known in the art, including the phenolic stabilizers, as well as the stabilizing acids such as citric acid, tartaric acid, ascorbic acid, and the like, as well as the esters of organic acids and other well known stabilizing materials.

The invention has been described in considerable detail with particular reference to certain preferred embodiments thereof, but it will be understood that variations and modifications can be employed within the spirit and scope of the invention as described hereinabove and as defined in the appended claims.

We claim:
1. A new class of chemical compounds having the following formula:

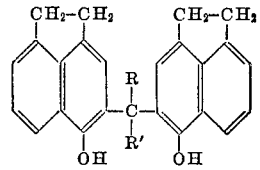

wherein R and R' each represents a member selected from the group consisting of a hydrogen atom and an alkyl radical containing from 1 to 8 carbon atoms.
2. 4,4'-methylenebis(5-acenaphthenol).
3. 4,4'-isobutylidenebis(5-acenaphthenol).
4. 4,4'-ethylidenebis(5-acenaphthenol).
5. 4,4'-(2-ethylhexylidene)bis(5-acenaphthenol).
6. 4,4'-butylidenebis(5-acenaphthenol).
7. Fats and oils stabilized with at least 0.001% by weight of a compound having the formula:

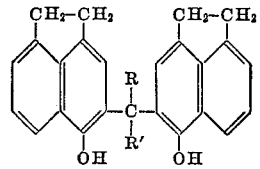

wherein R and R' each represents a member selected from the group consisting of a hydrogen atom and an alkyl radical containing from 1 to 8 carbon atoms.
8. Lard stabilized with at least 0.001% of 4,4'-methylenebis(5-acenaphthenol).
9. Lard stabilized with from about 0.001% to about 0.1% by weight of 4,4'-methylenebis(5-acenaphthenol).
10. Lard stabilized with from about 0.01% to about 0.1% by weight of 4,4'-isobutylidenebis(5-acenaphthenol).
11. Lard stabilized with from about 0.01% to about 0.1% by weight of 4,4'-ethylidenebis(5-acenaphthenol).
12. Lard stabilized with from about 0.01% to about 0.1% by weight of 4,4'-propylidenebis(5-acenaphthenol).
13. Lard stabilized with from about 0.01% to about 0.1% by weight of 4,4'-butylidenebis(5-acenaphthenol).
14. A composition comprising a normally oxidizable organic material stabilized with a compound of the formula

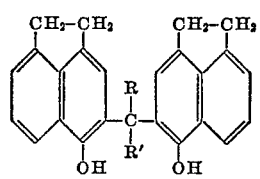

wherein R and R' each represents a member selected from the group consisting of a hydrogen atom and an alkyl radical containing from 1 to 8 carbon atoms.

No references cited.